(12) United States Patent
King et al.

(10) Patent No.: US 12,498,980 B1
(45) Date of Patent: Dec. 16, 2025

(54) DYNAMICALLY PARALLELIZED WORKFLOW PROCESSING

(71) Applicant: Amazon Technologies, Inc., Seattle, WA (US)

(72) Inventors: Scott Matthew King, Parksville (CA); Justin Wayne Callison, Vancouver (CA); Jalandip Lepcha, Vancouver (CA); Daniel James Ronald, Vancouver (CA); Feng Qiu, Calgary (CA); Diego Raphael Pedroza Santiviago, Burnaby (CA); Gabriel Howard Mastey, North Vancouver (CA); Maury Richard Sponchia, Delta (CA); Russell William Mackenzie, Bowen Island (CA)

(73) Assignee: Amazon Technologies, Inc., Seattle, WA (US)

( * ) Notice: Subject to any disclaimer, the term of this patent is extended or adjusted under 35 U.S.C. 154(b) by 551 days.

(21) Appl. No.: 18/067,555

(22) Filed: Dec. 16, 2022

(51) Int. Cl.
*G06F 9/50* (2006.01)
*G06F 9/48* (2006.01)

(52) U.S. Cl.
CPC .......... *G06F 9/5038* (2013.01); *G06F 9/4881* (2013.01)

(58) Field of Classification Search
None
See application file for complete search history.

(56) References Cited

U.S. PATENT DOCUMENTS 11,416,374 B1 * 8/2022 Wu ..................... G06F 11/3636

* cited by examiner

*Primary Examiner* — Adam Lee
(74) *Attorney, Agent, or Firm* — Knobbe, Martens, Olson & Bear LLP (57) ABSTRACT

System and methods are provided for dynamically parallelized large data set processing. A workflow includes a distributed map state. A set of steps in the distributed map state are run for each item in a collection of items or for each batch. Execution of the distributed map state is dynamically parallelized such that the system creates as many parallel workflows as there are items in the collection at run time (or batches). The items in the collection are dynamically determined by the workflow system, as defined by a resource in the distributed map state.

21 Claims, 5 Drawing Sheets

DYNAMICALLY PARALLELIZED WORKFLOW PROCESSING

BACKGROUND

Some workflow systems allow process automation, which includes the ability to build distributed applications and orchestrate microservices. Workflow systems can be used to process data, such as executing machine learning pipelines or processing image data. Workflow systems can be coupled with an on-demand code execution system that enables rapid execution of code, which may be supplied by users of the workflow and on-demand code execution systems. The workflow and on-demand code execution systems may be implemented in a serverless environment. In serverless or cloud computing environments, responsibility for managing generation, configuration, and state of an underlying execution environment may be abstracted away from a user. In some of these environments, the user need not create the execution environment, install an operating system, or manage a state of the environment in order to execute desired code in the environment.

BRIEF DESCRIPTION OF THE DRAWINGS

These and other features, aspects and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

DETAILED DESCRIPTION

Existing workflow systems can have one or more limitations. In some workflow systems, there can be data size limitations regarding the input data that can be passed into a workflow step. The data size limitations between workflow steps can make it difficult to process large data sets efficiently since the size of the list of items for processing can exceed the data limitation. In some workflow systems, the maximum number of concurrent workers that are capable of being supported in those systems can be limited. As used herein, a "worker" can refer to code responsible for causing a task to be executed in a workflow. In existing systems, a number of concurrent iterations may be limited. When this occurs, some iterations may not begin until previous iterations have completed. The limited number of concurrent workers can make it difficult to process large data sets efficiently since data processing throughput is negatively affected by the limited number of concurrent workers.

Generally described, aspects of the present disclosure are directed to large data set processing via a workflow system. A workflow can be defined by a user. One state in the workflow can be a distributed map state. A set of steps in the distributed map state can be run for each item in a collection of items. Moreover, execution of the distributed map state can be dynamically parallelized such that the workflow system can create as many parallel workflows as there are items in the collection at run time. The items in the collection may be dynamically determined by the workflow system, as defined by a resource in the distributed map state. The workflow system can support retrieving items in various different ways, such as, but not limited to, retrieving items from a database, retrieving items stored in a bucket in an object storage service, or retrieving items via an Application Programming Interface (API) call to a service storing the items. The workflow system can further support batching the items and processing each batch using the steps in the distributed map state. Whether and how items are batched can be user defined.

As used herein, a "distributed map state" refers to a state in a workflow that is used to dynamically run a set of steps for each item in a collection of items or each batch in a collection of batches, where the runs occur in parallel on multiple host computing devices. In some embodiments, the distributed map state includes an item processor, which is the workflow that processes each item in the collection of items or each batch in the collection of batches. The distributed map state can include a resource field. As described herein, the value for the resource field can identify the items to be processed. The distributed map state can include a batch parameter field. As described herein, the value for the batch parameter field can identify how many items should be grouped together in a batch. In some embodiments, if the batch parameter value is set to one or null, then the workflow system can treat an individual item as a batch instead of putting multiple items in batch.

As described above, some existing workflow systems can be limited with respect to input data size for a workflow step. In some implementations, the limit can be a fixed data size, such as 256 kilobytes of data. In those systems, the limit of items that can be processed as input to a step can include the number of item identifiers that can fit under 256 kilobytes. The systems and methods described herein may work around that data size limit by using a custom resource parameter. As described herein, without being limited to the following examples, the resource parameter may identify a bucket in an object storage service containing items or an API call that is configured to return a set of items. The custom resource parameter in a workflow system may advantageously allow a user-defined workflow to process a greater number of items than workflow systems without the custom resource parameter. The systems and methods described herein may improve existing serverless-workflow-related technology. Accordingly, the improvements in serverless-workflow-related technology can result in improvements to a computer and/or a computing system itself since the computer and/or computing system can concurrently process more items than previous systems.

As described above, some existing workflow systems can be limited with respect to concurrent iterations. In some existing systems, the limit can be based on the number of concurrent workers that a single host can support for performance reasons. When this occurs, some iterations may not begin until previous iterations have completed, which can decrease data throughput for a particular workflow run. The systems and methods described herein may remove the foregoing limit on concurrent workers by spawning parallel child executions on distinct host computing devices based on the number of items and/or batches of items. The solutions described herein improve over existing distributed processing systems, and, in particular, the data throughput capabilities of existing distributed processing systems. Accordingly, the improvements in distributed-processing-related technology can result in improvements to a computer and/or a computing system itself since the computer and/or computing system can concurrently process more iterations than previous systems.

In some existing workflow systems, there can be a limit regarding a number of logging events that can be persisted per workflow execution. In those systems, the logging limit can be applied to all sub-workflows in a parent workflow. The systems and methods described herein may work around that logging limit by treating each child execution of a workflow as a separate workflow with its own logging limit. In some embodiments, the solutions described herein can improve over existing distributed processing systems, and, in particular, by effectively allowing more logging of the distributed processing. Accordingly, the improvements in distributed-processing-and-logging-related technology can result in improvements to a computer and/or a computing system itself since the computer and/or computing system can store more log entries than previous systems.

As used herein, "item" and "item identifier" may be used interchangeably. The value for a resource field in a distributed map can identify a database resource that has a collection of item identifiers. The workflow system can extract the item identifiers at the resource and the distributed map state can process each item identified by the respective item identifiers associated with the resource value.

Figure 1:
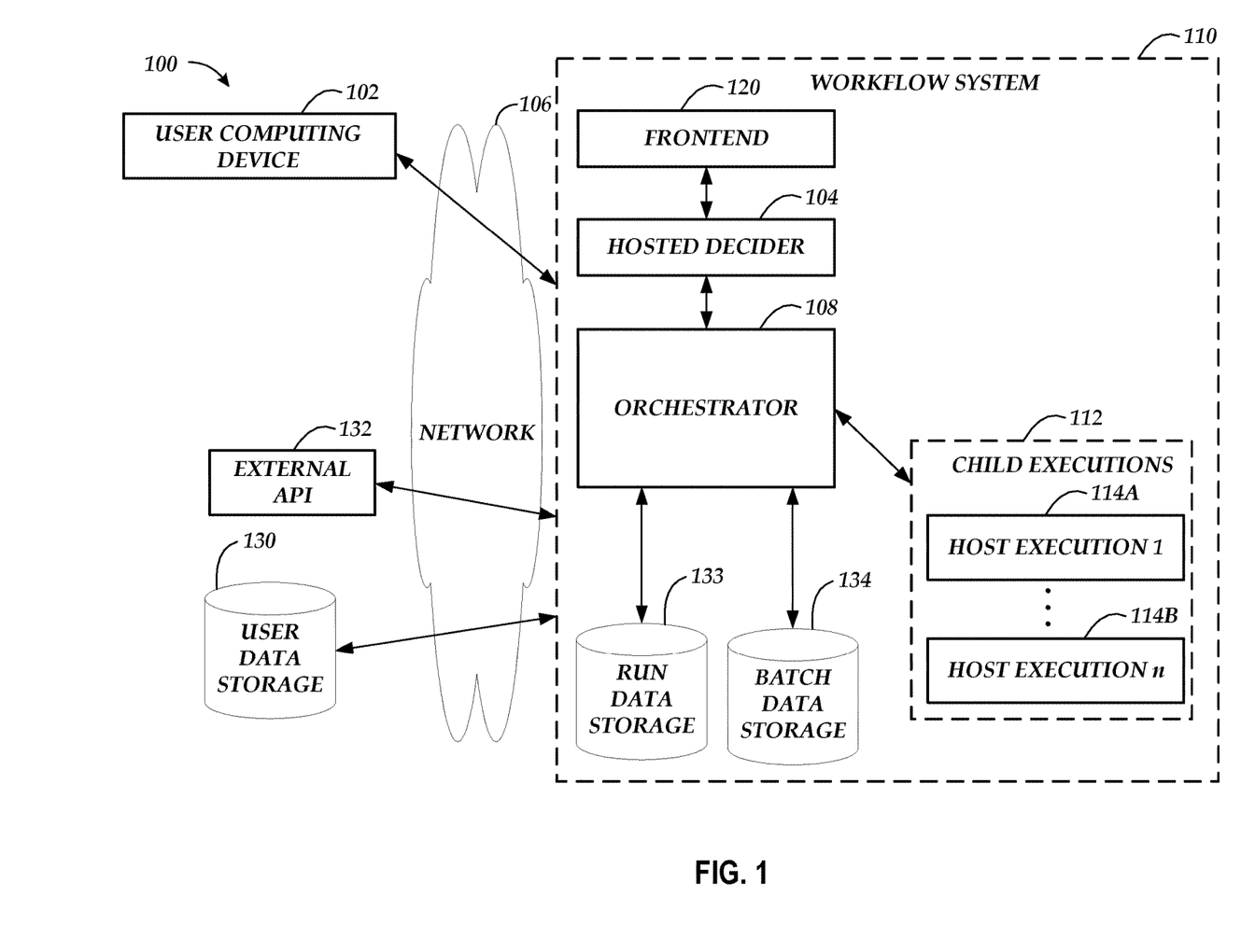
FIG. 1 is a schematic block diagram depicting an illustrative network environment for implementing a workflow system.

Turning to FIG. 1, an illustrative network environment 100 is shown in which a workflow system 110 may process workflows. The network environment 100 may include one or more user computing devices 102, a user data storage 130, an external API 132, and the workflow system 110. The workflow system 110 may include a frontend 120, a hosted decider 104, an orchestrator 108, child executions 112, run data storage 133, and batch data storage 134. The constituents of the network environment 100 may be in communication with each other either locally or over a network 106. While certain constituents of the network environment 100 are depicted as being in communication with one another, any constituent of the network environment 100 may be able to communicate with any other constituent of the network environment 100; however, not all of these communication lines are depicted in FIG. 1.

To enable interaction with the workflow system 110, the workflow system 110 can include one or more frontends 120. The frontend 120 can enable users, via user computing devices 102, to configure workflows, schedule workflow executions, and/or monitor workflow executions. The frontend 120 may include a request interface providing user computing devices 102 with the ability to upload or otherwise configure workflows and to thereafter request or schedule execution of the workflows. In some embodiments, the request interface communicates with external computing devices (e.g., user computing devices 102 via a graphical user interface (GUI), command-line interface (CLI), or API. The frontend 120 can ensure that users are properly authorized. The user computing devices 102 can include, but are not limited to, a laptop or tablet computer, personal computer, personal digital assistant (PDA), hybrid PDA/mobile phone, mobile phone, and/or a smartphone. In some embodiments, a workflow can be initiated or scheduled by a service. Some workflows can be initiated or scheduled automatically. For example, if an object is modified in a data store or a new object is uploaded to a data store, a service can detect the change and initiate a workflow.

While not illustrated, in some embodiments, the workflow system 110 can include or be in communication with an on-demand code execution system. Similar to the frontend 120 of the workflow system 110, the on-demand code execution system can include a frontend. The frontend of the on-demand code execution system can enable users (via user computing devices 102) to provide computer executable code. In some embodiments, the steps of a workflow can invoke user code that was submitted to the on-demand code execution system.

The hosted decider 104 can determine when a scheduled workflow should be executed. The orchestrator 108 can perform a number of tasks and can be configured to support distributed map states. The orchestrator 108 can receive a command to initiate a run of a distributed map state. The orchestrator 108 can perform an initialization to get a map run ready, which can include retrieving the items identified by the resource in the distributed map state. The orchestrator 108 can communicate with a user data storage 130 or an external API 132 to retrieve the items. The orchestrator 108 can batch the items and initiate child executions 112 for each of the batches. The child executions can include multiple host executions 114A, 114B, which can be run in parallel on multiple host computing devices. Output from the host executions 114A, 114B can be stored in the user data storage 130. The orchestrator 108 can store run data in the run data storage 133 and batch data in the batch data storage 134. Information regarding the map run (such as logging entries for individual host executions or the overall map run) can be written to the run data storage 133 and/or the batch data storage 134.

The user data storage 130, the run data storage 133, and/or the batch data storage 134 may be embodied in hard disk drives, solid state memories, or any other type of non-transitory computer-readable storage medium. The user data storage 130, the run data storage 133, and/or the batch data storage 134 may also be distributed or partitioned across multiple local and/or remote storage devices. The user data storage 130, the run data storage 133, and/or the batch data storage 134 may comprise a data store. As used herein, a "data store" can refer to any data structure (and/or combinations of multiple data structures) for storing and/or organizing data, including, but not limited to, relational databases (e.g., Oracle databases, MySQL databases, etc.), non-relational databases (e.g., NoSQL databases, etc.), key-value databases, in-memory databases, tables in a database, a file system/store, an object storage service, a block storage service, and/or any other known format for data storage or any combination thereof.

The network 106 may be any wired network, wireless network, or combination thereof. The network 106 may be a personal area network, local area network, wide area network, cable network, satellite network, cellular telephone network, or any combination thereof. In addition, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long-Term Evolution (LTE) network, or any other type of wireless network. The network 106 can use protocols and components for communicating via the Internet or any of the other aforementioned types of networks, such as HTTP.

Additionally, in some embodiments, the workflow system 110 or components thereof are implemented by one or more virtual machines implemented in a hosted computing environment. The hosted computing environment may include one or more on-demand or reservable computing resources offered by a service provider. The computing resources may include hardware computing, networking and/or storage devices or services configured with specifically configured computer-executable instructions. A hosted computing environment may also be referred to as a serverless, cloud, distributed computing, or infrastructure as a service environment.

Figure 2:
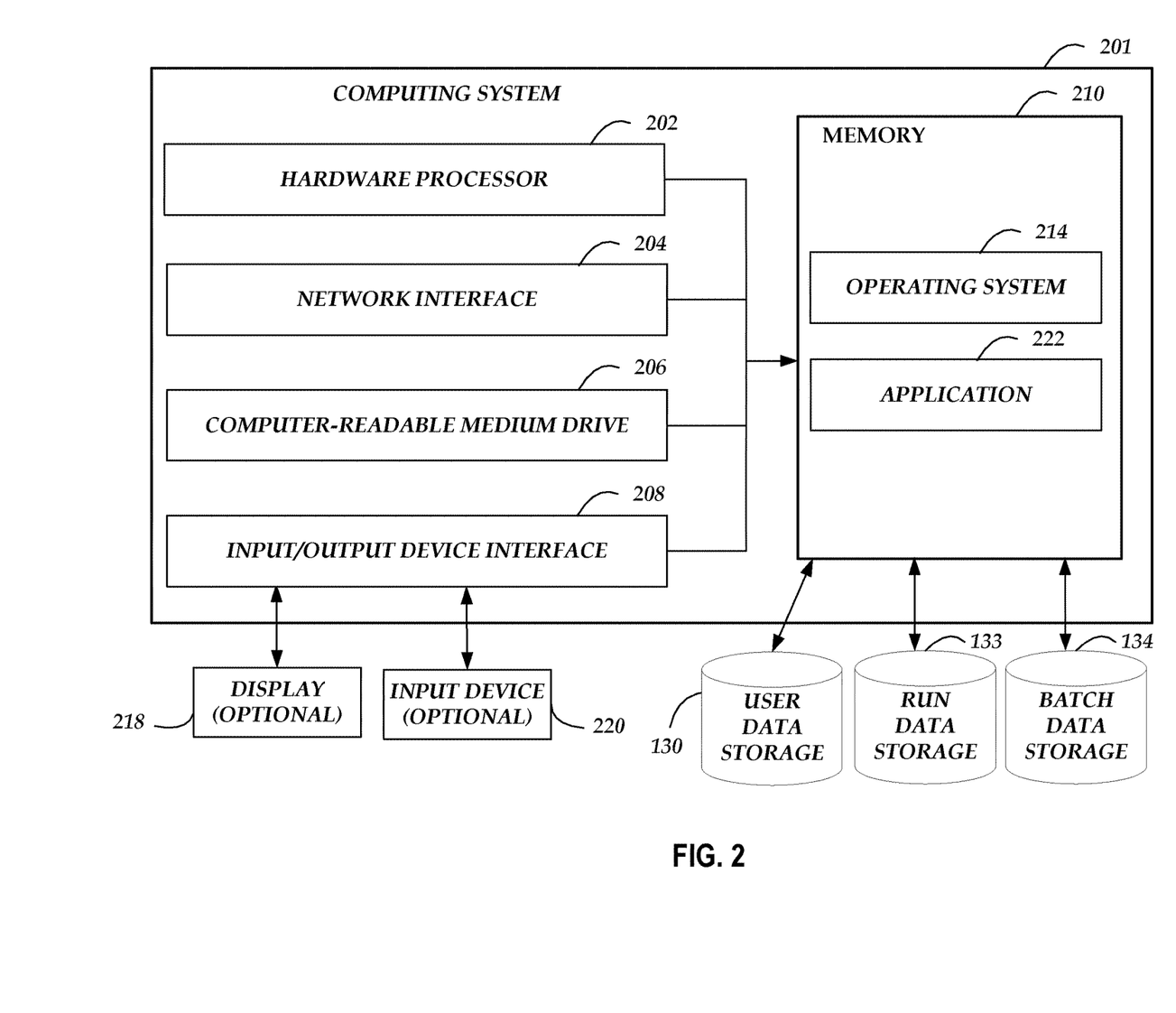
FIG. 2 is a schematic block diagram depicting an illustrative general architecture of a computing system for implementing an orchestrator of the workflow system referenced in the network environment depicted in FIG. 1.

FIG. 2 is a schematic diagram of an illustrative general architecture of a computing system 201 for implementing a workflow system 110 referenced in the environment 100 in FIG. 1. The computing system 201 includes an arrangement of computer hardware and software components that may be used to execute the application 222. The general architecture of FIG. 2 can be used to implement other devices described herein, such as the user computing device 102 referenced in FIG. 1. The computing system 201 may include more (or fewer) components than those shown in FIG. 2. Further, other computing systems described herein may include similar implementation arrangements of computer hardware and/or software components.

The computing system 201 for implementing a device within the workflow system 110 may include a hardware processor 202, a network interface 204, a non-transitory computer-readable medium drive 206, and an input/output device interface 208, all of which may communicate with one another by way of a communication bus. As illustrated, the computing system 201 is associated with, or in communication with, an optional display 218 and an optional input device 220. The network interface 204 may provide the computing system 201 with connectivity to one or more networks or computing systems. The hardware processor 202 may thus receive information and instructions from other computing systems or services via the network 106. The hardware processor 202 may also communicate to and from memory 210 and further provide output information for an optional display 218 via the input/output device interface 208. The input/output device interface 208 may accept input from the optional input device 220, such as a keyboard, mouse, digital pen, and/or touch screen. The input/output device interface 208 may also output audio data to speakers or headphones (not shown).

The memory 210 may contain specifically configured computer program instructions that the hardware processor 202 executes in order to implement one or more embodiments of a device within the workflow system 110. The memory 210 generally includes RAM, ROM and/or other persistent or non-transitory computer-readable storage media. The memory 210 may store an operating system 214 that provides computer program instructions for use by the hardware processor 202 in the general administration and operation of the device within the workflow system 110.

The memory 210 may include one or more applications 222 that may be executed by the hardware processor 202. In some embodiments, the one or more applications 222 may implement various aspects of the present disclosure. In some embodiments, the one or more applications 222 can receive a command to initiate a run of a distributed map state. The one or more applications 222 can initialize an environment for a map run, including retrieving the items identified by the resource in the distributed map state. The one or more applications 222 can orchestrate the child executions of the map run. Output from the child executions can be received by the one or more applications 222 and stored in the user data storage 130. The one or more applications 222 can store run data in the run data storage 133 and/or batch data in the batch data storage 134.

Figure 3:
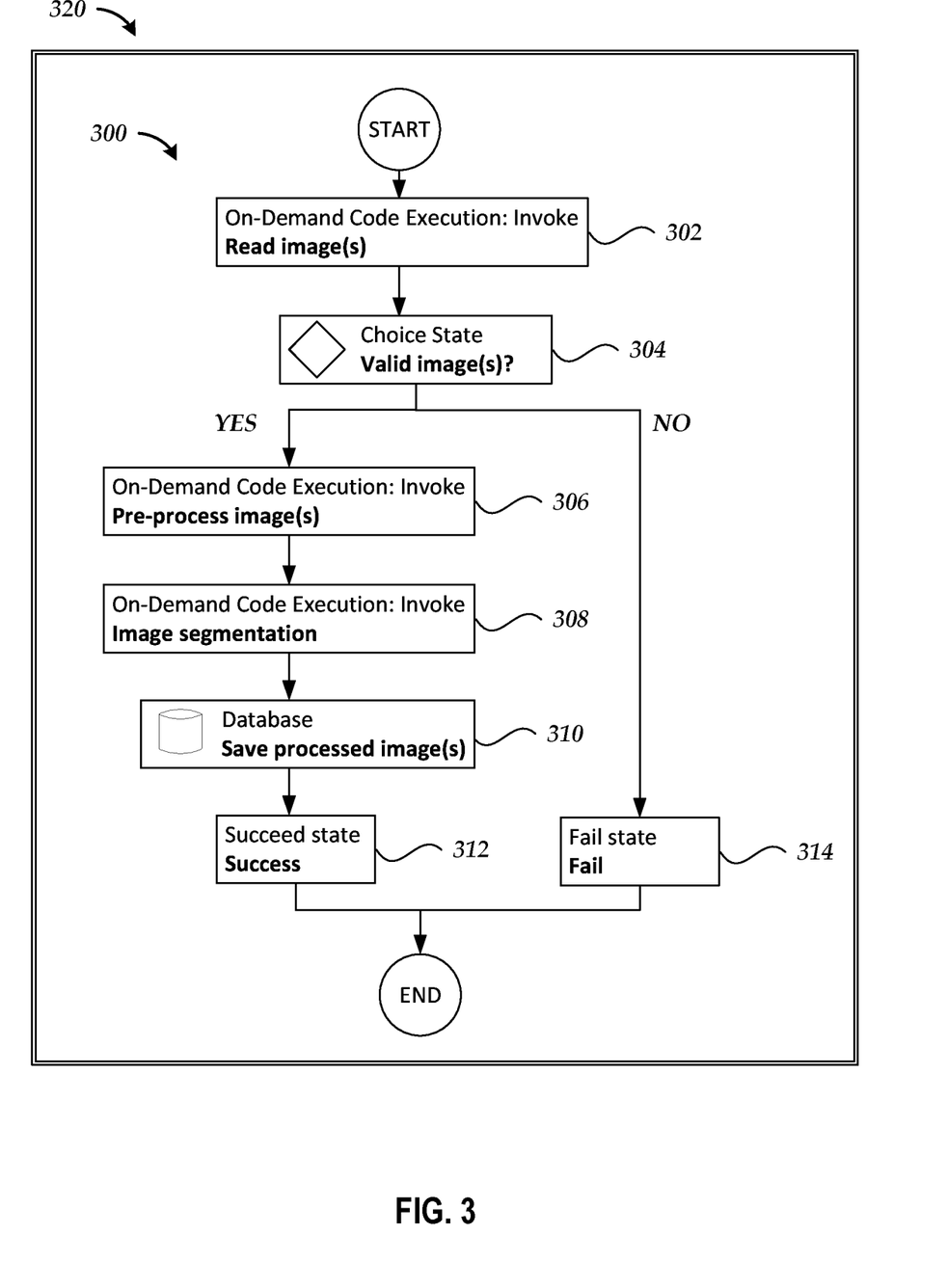
FIG. 3 depicts a visual representation of a workflow that can be used by the workflow system.

FIG. 3 depicts a visual representation of a workflow 300 that can be used by the workflow system 110. The workflow 300 is composed of states. Individual states can make decisions based on their input, perform actions from those inputs, and/or pass output to other states. States can include, but are not limited to, a task state (perform some work in a workflow), a choice state (make a choice between branches of execution), a fail state (stop an execution with a failure), a succeed state (stop an execution with a success), a pass state (pass its input to its output or inject some data into the workflow), a wait state (delay for a certain amount of time or until a specified date and time), a database state (save some data to a database), and/or a distributed map state.

The particular workflow 300 can generally be directed towards image processing. The first state 302 can be or correspond to a task state. The first state 302 can be configured to invoke an on-demand execution of user-submitted code instructions for reading one or more images. Input to the first state 302 can be one or more item identifiers. If batches were being used for the workflow 300, the first state 302 can receive a batch of item identifiers. At the first state 302, one or more images can be retrieved from a database based on the item identifiers and according to the user-submitted code instructions. After retrieving the one or more images at the first state 302, the workflow 300 proceeds to a second state 304.

The second state 304 can be or correspond to a choice state. The second state 304 can decide between two or more branches of execution. In this case, user-submitted code at the second state 304 can determine either that the one or more retrieved images are valid or invalid. An invalid image can be, for example, one that is not a supported file type or one that has insufficient resolution for processing. If the one or more images are valid, the workflow 300 proceeds to a third state 306. If the one or more images are invalid, the workflow 300 can proceed to a seventh state 314, which can be or correspond to a fail state.

The third state 306 can be or correspond to a task state. The third state 306 can be configured to invoke an on-demand execution of user-submitted code instructions for pre-processing the one or more images. The user-submitted code instructions can be configured to resize, orient, and/or color correct the one or more images. After pre-processing the one or more images at the third state 306, the workflow 300 proceeds to a fourth state 308.

The fourth state 308 can be or correspond to a task state. The fourth state 308 can be configured to invoke an on-demand execution of user-submitted code instructions for segmenting the one or more pre-processed images. The user-submitted code instructions can be configured to apply edge-based segmentation algorithms identify edges based on contrast, texture, color, and saturation variations in the one or more pre-processed images. After segmenting the one or more pre-processed images at the fourth state 308, the workflow 300 proceeds to a fifth state 310.

The fifth state 310 can be or correspond to a database state. The database state 310 can be configured to save the segmented images to a database. After storing the one or more segmented images at the fifth state 310, the workflow 300 proceeds to a sixth state 312, which can be or correspond to a success state.

FIG. 3 can further depict a graphical user interface 320 of the workflow system 110. The graphical user interface 320 can be provided by the frontend 120. A user can interact with the graphical user interface 320 to configure the workflow 300. In some embodiments, a user can, via the graphical user interface 320, search for, select, and/or configure the states. The graphical user interface 320 can include drag-and-drop functionality. In some embodiments, the frontend 120 can automatically generate data representing the workflow 300. As described herein, the workflow 300 can be stored in a data format, such as, but not limited to, a JavaScript Object Notation (JSON) data format.

As described herein, a distributed map state can run a set of steps for each item in a collection of items. In some embodiments, a distributed map state includes an item processor field. The item processor field can define a workflow that is configured to process each item in the collection of items. An example workflow definition including a distributed map state is provided below in Table 1. The workflow definition in Table 1 can be in a first data format, such as a JSON data format.

TABLE 1

("T1")

```
 1  {
 2    "StartAt": "Pre-process messages from queue",
 3    "States": {
 4      "Pre-process messages from queue": {
 5        "Type": "Task",
 6        "Resource": "on-demand-code-execution:invoke",
 7        "OutputPath": "$.Payload",
 8        "Parameters": {
 9          "FunctionName": "PreProcessQueue"
10        },
11        "Next": "Are there messages to process?"
12      },
13      "Are there messages to process?": {
14        "Type": "Choice",
15        "Choices": [
16          {
17            "Variable": "$",
18            "StringEquals": "No messages",
19            "Next": "Finish"
20          }
21        ],
22        "Default": "Process messages"
23      },
24      "Process messages": {
25        "Type": "Map",
26        "Next": "Finish",
27        "ItemReader": {
28          "Resource": "on-demand-code-execution:invoke",
29          "Parameters": {
30            "FunctionName": "ReadFromQueue"
31          }
32        },
33
34        "Item processor": {
35          "Config": {
36            "Mode": "Distributed"
37          },
38          "StartAt": "Write message to DB",
39          "States": {
40            "Write message to DB": {
41              "Type": "Task",
42              "Resource": "db:putItem",
43              "ResultPath": null,
44              "Parameters": {
45                "TableName": "MapTable",
46                "ReturnConsumedCapacity": "TOTAL",
47                "Item": {
```

TABLE 1-continued ("T1")

```
48                  "MessageId": {
49                    "S.$": "$.MessageDetails.MessageId"
50                  },
51                  "Body": {
52                    "S.$": "$.MessageDetails.Body"
53                  }
54                }
55              },
56              "Next": "Remove message from queue"
57            },
58            "Remove message from queue": {
59              "Type": "Task",
60              "Resource": "on-demand-code-execution:invoke",
61              "InputPath": "$.MessageDetails",
62              "ResultPath": null,
63              "Parameters": {
64                "FunctionName": "DeleteFromQueue",
65                "Payload": {
66                  "ReceiptHandle.$": "$.ReceiptHandle"
67                }
68              },
69              "Next": "Publish message to Notification Service topic"
70            },
71            "Publish message to Notification Service topic": {
72              "Type": "Task",
73              "Resource": "notification-service:publish",
74              "InputPath": "$.MessageDetails",
75              "Parameters": {
76                "Subject": "Message from Queue",
77                "Message.$": "$.Body",
78                "Topic": "NotificationServiceTopic-1"
79              },
80              "End": true
81            }
82          }
83        }
84      },
85      "Finish": {
86        "Type": "Succeed"
87      }
88    }
89  }
```

In the example workflow in Table 1, messages from a queue can be processed. At the "Pre-process messages from queue" state (T1 lines 4-10), an on-demand code execution function "PreProcessQueue" (T1 line 9) is executed. At the "Are there messages to process?" state (T1 lines 13-23), if output from the function indicates "No messages," then the workflow ends, otherwise the workflow proceeds to the "Process messages" state (beginning at T1 line 24), which can be or corresponds to a distributed map state. The distributed map state can invoke an on-demand code execution function "ReadFromQueue" (T1 line 30) to load messages from a queue. As described herein, this approach to the distributed map state can advantageously overcome the data size limit for the amount of data that can be passed between states. In some embodiments, the distributed map state can be a map state with a configuration parameter that indicates it should be distributed (here the "Distributed" configuration parameter shown at T1 line 36). The distributed map state can include an item processor field (beginning at T1 line 34), which specifies the workflow that processes each item in the collection of items. As described herein, many messages can be processed in parallel. The workflow system 110 can create as many parallel item processor workflows as there are items in the collection at run time. In the item processor workflow, the "Write message to DB" writes the item (a message) to a database. Next, the "Remove message from queue" state removes the processed message from the queue.

The "Publish message to Notification Service topic" state publishes the message to a notification service and then the workflow ends.

In the example of T1, between lines 44 and 54, the "Parameters" field can be used to create a collection of key-value pairs that are passed as input. As shown at lines 49 and 52, the values in the Parameters field can be selected from the input with a path. For key-value pairs where the value is selected using a path, the key name can end in ".$." A path can be a string beginning with the "$" that can be used to identify components within data (such as JSON text).

In some embodiments, while not shown in Table 1, the distributed map state can include additional parameters. The distributed map state can include a reader configuration, such as a "ReaderConfig" element under the "ItemReader" element. The reader configuration can include an input type, such as a delimited format (such as comma separated values (CSV) type) or a JSON data format. The reader configuration can include metadata regarding parsing the input. In the case of a delimited format, the reader configuration can include the header names and/or header locations. Moreover, in some embodiments, the resource of the distributed map state can be different than what is shown in Table 1. In some embodiments, the resource can identify a data store location instead of a function call that provides the items. In some embodiments, the distributed map state can include a batch parameter, such as a maximum items per batch and/or a maximum input bytes per batch. In some embodiments, the distributed map state can include a results writer configuration, such as data store location to write the results. In some embodiments, the distributed map state can include a concurrency limitation option. As described herein, the concurrency limitation option can be a number. In some embodiments, the distributed map state can include a tolerated threshold configuration, such as a tolerated failure count or a tolerated failure percentage.

Figure 4:
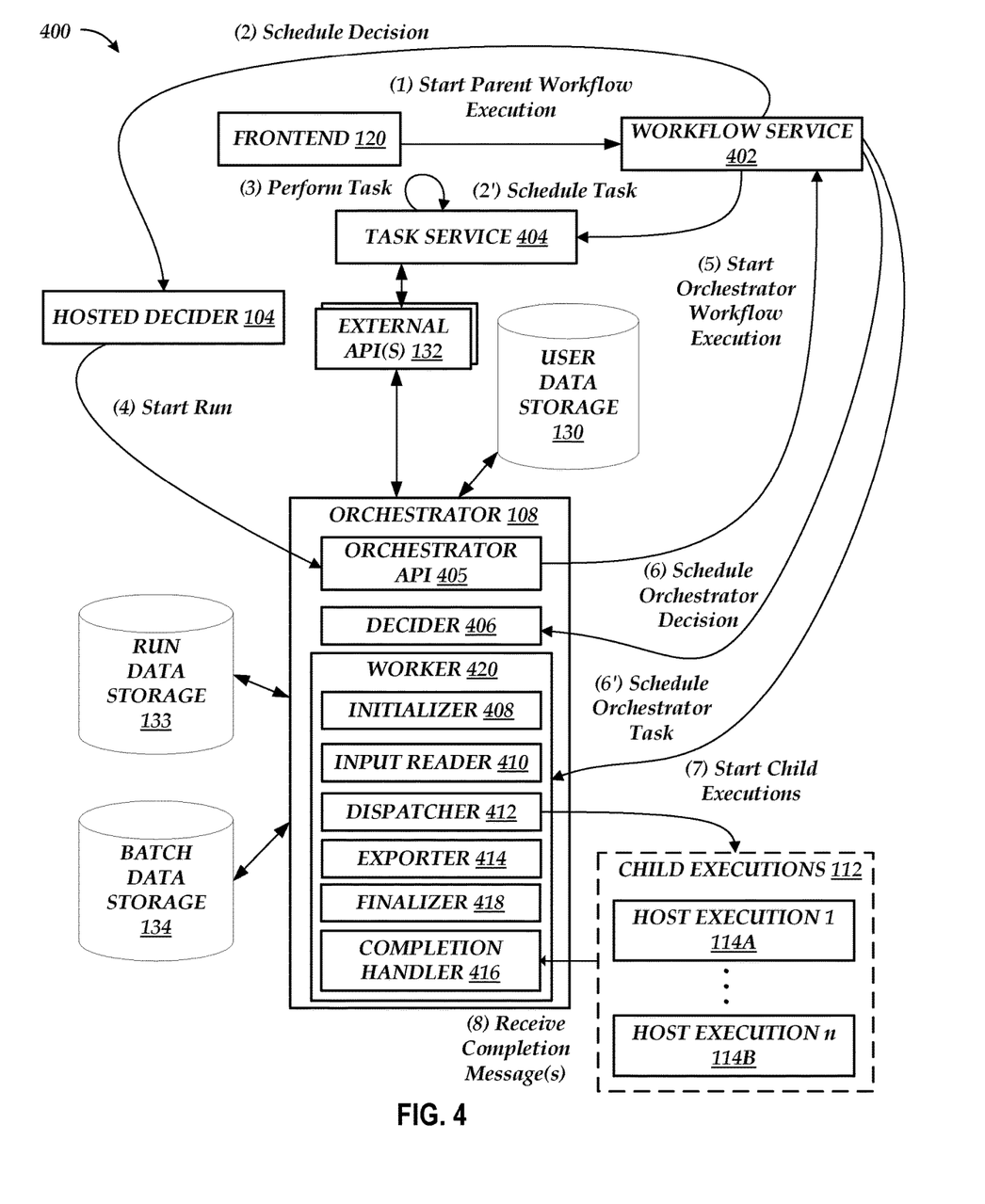
FIG. 4 is a flow diagram depicting illustrative interactions for large data set processing in a workflow system.

With reference to FIG. 4, in some embodiments, illustrative interactions are depicted for large data set processing in a workflow system. The environment 400 of FIG. 4 can be similar to the environment 100 of FIG. 1. The environment 400 of FIG. 4 can include a workflow service 402 and a task service 404. The orchestrator 108 can include an orchestrator API 405, a decider 406, and a worker 420. The worker 420 can include an initializer 408, an input reader 410, a dispatcher 412, an exporter 414, a completion handler 416, and a finalizer 418. Other interactions (not illustrated) may be possible in accordance with the present disclosure in other embodiments. Similar to the communication depictions of FIG. 1, not every possible communication may be depicted in FIG. 3.

The interactions of FIG. 4 begin at step one (1), where the frontend 120 can start a parent workflow execution. The frontend 120 can initiate a parent workflow execution by sending a message to the workflow service 402. In some embodiments, the workflow service 402 can be a network service that coordinates work across distributed application components. Under the workflow service 402, tasks can represent invocations of steps in one or more applications. Tasks can be processed by workers, which can be programs that interact with the workflow service 402 to get tasks, process them, and return their results. The workflow service 402 can manage execution of dependencies, manage scheduling, and/or manage concurrency in accordance with the logical flow of the one or more applications. As described herein, the frontend 120 can provide a graphical user interface that allows users to configure workflows. As described herein, a workflow can describe a series of steps, the relationships between the steps, and/or the inputs and outputs of the steps. A workflow can contain a number of states, each of which represents an individual step in the workflow. States can perform work, make choices, pass parameters, initiate parallel execution, manage timeouts, and/or terminate a workflow with a success or failure.

At step two (2), the workflow service 402 schedules a decision for what to do next in the workflow. At step two prime (2'), the workflow service 402 schedules a task. The task service 404 can perform the task at step (3). In some embodiments, according to user configuration of the parent workflow, the task service 404 can perform tasks, such as, but not limited to, calling an external API 132. At step (4), steps in the parent workflow can execute until the hosted decider 104 gets to a step in the parent workflow that can require invoking the orchestrator 108, such as, but not limited to, a distributed map state. At step (4), the hosted decider 104 can start a run by calling a function in the orchestrator API 405.

At step (5), the orchestrator API 405 can start an orchestrator workflow execution. The orchestrator API 405 can initiate an orchestrator workflow execution by sending a message to the workflow service 402. As described herein, a distributed map state can include its own workflow, which can be executed by the orchestrator 108. At step six (6), the workflow service 402 schedules an orchestrator decision for what to do next in the orchestrator workflow.

At step six prime (6'), the workflow service 402 schedules an orchestrator task. Once the task is executed, the worker 420 goes through a number of steps. In some embodiments, some steps may be executed concurrently with other steps. The input reader 410 can run concurrently with the dispatcher 412 to be able to start the next child execution as soon as enough additional items have been read by the item reader. Alternatively, the dispatcher 412, the completion handler 416, and the exporter 414 may run concurrently so the exporter 414 can write outputs as soon as the child executions 112 complete. The initializer 408 can setup the resources necessary to do the processing because a run can process a large amount of data, which might require a large amount of computing resources. The input reader 410 can read the input for the collection of items. As described herein, input can be read from a number of sources, such as, but not limited to, an external API 132 and/or the user data storage 130, which can be specified by a field in a workflow of the orchestrator workflow. As described herein, since the collection of items are read from the user-specified source, in some embodiments, the orchestrator workflow can overcome the data input size limitations between steps in a workflow. The orchestrator 108 can access and/or store information regarding runs and/or batches in the run data storage 133 and the batch data storage 134.

At step seven (7), the dispatcher 412 starts child executions. As described herein, the executions can invoke the internal workflow, such as the item processor workflow of a distributed map state, on each item from the collection of items or each batch from multiple batches created from the collection of items. The host executions 114A, 114B execute the specified workflow. In some embodiments, there can be a concurrency limitation option and a user can set a concurrency limitation option to a number, such as 10,000, 100,000, or a million concurrent executions, for example. The dispatcher 412 can start new child executions until the concurrency limitation option is reached or there are no additional items or batches to process; once one or more child executions complete, then the dispatcher 412 can start new child executions until the concurrency limitation option is reached again or there are no additional items or batches to process. At step eight (8), the completion handler 416 can receive messages from the host executions 114A, 114B that a child run has completed. The exporter 414 can extract the output from each host execution 114A, 114B and store the results to the user data storage 130. The finalizer 418 can tear down the resources, which can include the state of computing devices, setup by the initializer 408. The worker 420 can then complete the run of the internal workflow on the collection of items.

Figure 5:
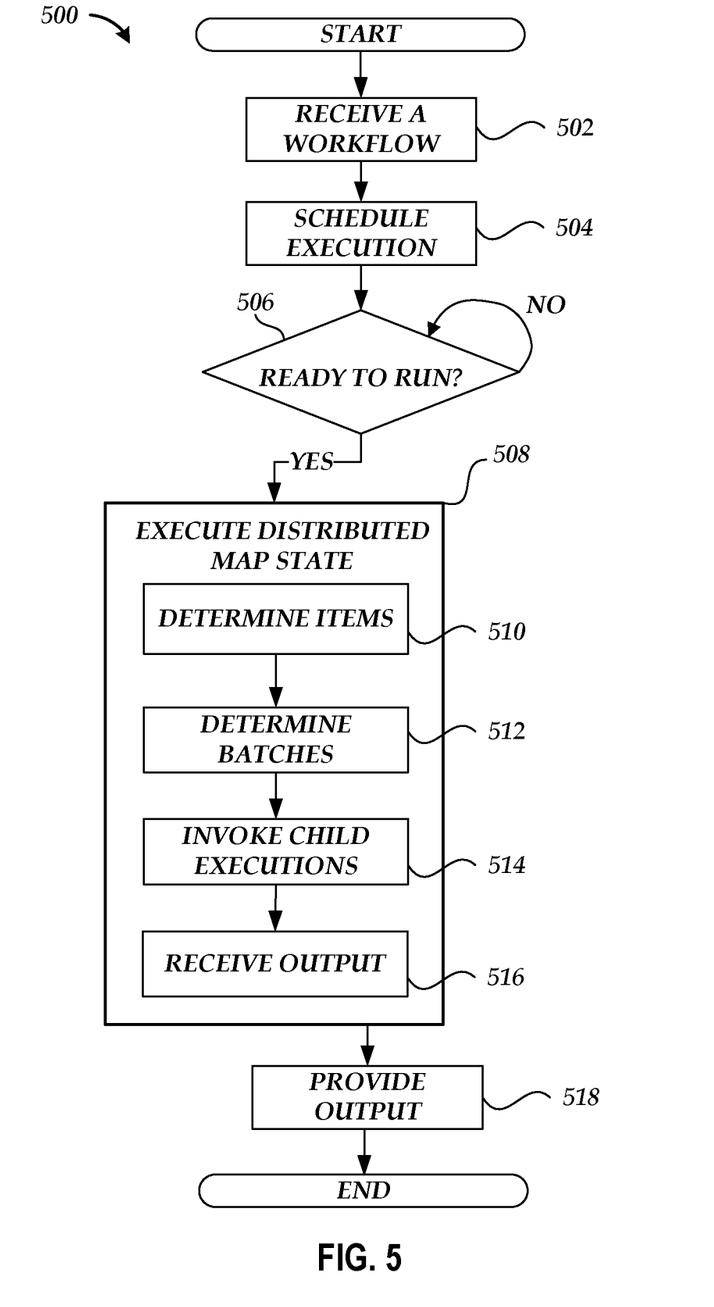
FIG. 5 is a flow chart depicting a method for dynamic parallelized large data set processing.

FIG. 5 is a flow chart depicting a method 500 implemented by the workflow system 110 of FIG. 1 for dynamic parallelized large data set processing. As described herein, the workflow system 110 of FIG. 1 may include various devices, services, and/or applications, some of which may implement aspects of the method 500 as described herein. Additional details regarding aspects of the method 500 are described in further detail above with respect to FIG. 4.

Beginning at block 502, a workflow can be received. The frontend 120 can receive a workflow. As described herein, the frontend 120 can provide a graphical user interface that allows users to configure workflows. A workflow can describe a series of steps, the relationships between the steps, an input of a step, and/or an output of a step. A workflow can contain a number of states, each of which represents an individual step in the workflow. A workflow can include a distributed map state. A distributed map state can include a resource, a batch parameter, and/or another workflow. The distributed map state can be used to dynamically process very large data sets in parallel. In some embodiments, the distributed map state can include a concurrency limitation option that indicates a concurrency criterion for simultaneous child executions. Additional details regarding workflows are described in further detail herein, such as with respect to FIG. 3 and Table 1. As described herein, a workflow can be in a particular data format, such as, but not limited to, a JSON data format. As described herein, a workflow definition can define a first workflow process, which can include a distributed map state. The workflow definition can indicate, for the distributed map state, a resource, a batch parameter, and a second workflow.

In some embodiments, the frontend 120 can cause presentation of a graphical user interface that is a workflow editor. The frontend 120, can receive, via the graphical user interface, user input of a step in a visual workflow. In some embodiments, a user can select the steps in the visual workflow. The frontend 120 can generate the first workflow based on the steps in the visual workflow. In some embodiments, the frontend 120 has computer instructions to generate a workflow in a particular data format, such as, but not limited to, a JSON data format. Additional details regarding graphical user interface are described in further detail herein, such as with respect to FIG. 3.

At block 504, an execution of the workflow can be scheduled. The workflow service 402 can schedule the workflow to be executed. In some embodiments, the frontend 120 can allow a user to schedule a time-based schedule for the workflow, such as the workflow being scheduled to run once an hour, once a day, once a week, etc. Additionally or alternatively, the frontend 120 can allow a user to initiate execution of a workflow on an ad-hoc basis.

At block 506, it can be determined whether the first workflow is ready for execution. The hosted decider 104 can determine that the first state machine is ready for execution. The hosted decider 104 can determine that the time-based schedule has been satisfied or an ad-hoc execution has been initiated. As a result, the workflow service 402 can execute states in the workflow. The workflow service 402 can execute a workflow process in accordance with a workflow definition. The hosted decider 104 can also determine that a distributed map state in the workflow is ready to run. If the first workflow or the distributed map state is not ready for execution, the method 500 can return to block 506 until either the first workflow or the distributed map state is ready for execution.

At block 508, the distributed map state can be executed. The orchestrator 108 can execute the distributed map state. Execution of the distributed map state can include the execution of the sub-blocks 510, 512, 514, 516. The workflow service 402 can execute the distributed map state as part of a workflow process. Additional details regarding the orchestrator 108 executing the distributed map state is described in further detail herein, such as with respect to FIG. 4.

At block 510, items can be determined. The input reader 410 can determine the items for the distributed map state execution based on the resource. As described herein, the resource allows a user to identify the source of the items. For example, the collection of items can be a collection of any data objects, such as, but not limited to, images. In some embodiments, the resource can identify a data store or a location in a data store. The input reader 410 can load a collection of items (such as item identifiers) from the data store or the location in the data store. Additionally or alternatively, the resource can identify an API. The input reader 410 can call the API and receive, from the API, a collection of items (such as item identifiers). As described herein, the input reader 410 can overcome limitations regarding the input data size between states in some embodiments. The input reader 410 can determine the items by determining a collection of item identifiers (such as image identifiers) from the source identified by the resource. Each item identifier (such as an image identifier) of the collection of item identifiers (such as the collection of image identifiers) identifies a particular item (such as image).

In some embodiments, the workflow in the distribute map state (such as an item processor workflow) can include a first state and a second state. Output from the first state as input to the second state can be limited to a first data input size (such as 256 kilobytes). As described herein, the data size of a collection of item identifiers (such as image identifiers) can advantageously exceed the first data input size.

At block 512, batches can be determined. The worker 420 can determine the batches. The distributed map state can include a batch parameter, such as a first number. The first number can be 1, 10, or 1,000, for example. The worker 420 can determine a threshold value based on the first number. In some embodiments, the threshold value can be assigned to the first number. The worker 420 can identify, from the collection of items, groups of items that are batched that satisfy the threshold value. In some embodiments, the worker 420 can identify, from the collection of items, groups of items (such as images) that are batched according to the first number. Thus, the count of items in each group can be less than or equal to the first number. The worker 420 can assign each group as a batch. If the first number is one, then each item can be treated as a batch. As another example, if there are 100,000 items, and the first number is 100, then there can be 1,000 batches of 100 items each. Users can configure the batch parameter based on downstream considerations, such as wanting to limit the transactions per second that may be affected by processing more items concurrently.

In some embodiments, the batch parameter can indicate a data size. The worker 420 can determine items per batch based on the data size. For example, if the data size is 200 kilobytes, then the worker 420 can group as many items as possible up to the 200 kilobytes data size. In some embodiments, a threshold value can be assigned to the data size. The worker 420 can identify, from the collection of items, groups of items that are batched that satisfy the threshold value. The worker 420 can identify a total data size for each group of items that satisfies the threshold value.

At block 514, child executions can be invoked. The dispatcher 412 can invoke, on a host computing device, a child execution of the workflow from the distributed map state with the batch as input to the workflow. As described herein, the dispatcher 412 can invoke as many child executions on the host computing devices to run in parallel as there are items or batches. The dispatcher 412 can determine a quantity of host computing devices based on a count of the batches. As described herein, the child executions of the workflow from the distributed map state on devices in the quantity of host computing devices can execute concurrently. In some embodiments, the quantity of host computing devices can match the count of batches. Alternatively, the dispatcher 412 can determine that the count of the batches fails to satisfy a concurrency criterion. The concurrency criterion can indicate that the count of the batches is too high for concurrent processing. In some embodiments, the dispatcher 412 can determine that the count of the batches exceeds a concurrency limitation number (which can be a configuration value set by a user for the distributed map state). In that case, the dispatcher 412 can assign the quantity of host computing devices to a concurrency number. Thus, the number of child executions that are being invoke concurrently may not exceed the concurrency number. As child executions complete, the dispatcher 412 may invoke additional child executions on the host computing devices until the concurrency number is reached or until all batches have been processed. Moreover, a profile associated with the workflow can have a tier or level associated with how many host computing devices can be allocated for the workflow. In some embodiments, either the worker 420 and/or the dispatcher 412 can throttle the batches or child executions based on performance metrics. A worker 420 can limit the transactions per second by adjusting the number of items per batch. Similarly, the dispatcher 412 can adjust the number of concurrent child executions to limit server usage.

In some embodiments, completion of the child executions of the workflow from the distributed map state on the host computing devices can be detected. The completion handler 416 can monitor the child executions of the workflow. In some embodiments, the completion handler 416 can monitor a message queue that child executions write to as their iterations of the workflow are completed. Completion of a child execution can include reaching a failed state or a partial fail state. The completion handler 416 can provide information to the dispatcher 412 to help determine the number of concurrently running child executions or the number of executions that have completed with a certain state, such as failed or timed out state. As described herein, the workflow definition can include failure thresholds that govern the behavior of the distributed map state when a certain threshold of child executions fails. For example, the workflow can end if the number of child executions reach the tolerated failure count or a percentage of the child executions reach the tolerated failure percentage. In some embodiments, when batching is being used, each child execution may indicate partial failure, such as where some items in the batch failed to complete while other items in a batch reached a completed state. In some embodiments, completion of the child execution generates output. In some embodiments, the output of a child execution can be a transformed image or an identifier of a transformed image.

At block 516, output can be received. The worker 420 can receive output generated by the child executions of the workflow from the distributed map state on the host computing devices. In an image processing example, the worker 420 can receive a transformed image generated by the child execution of the workflow on the host computing device. At block 518, output can be provided. The exporter 414 can handle the output from the child executions as specified by the workflow. In some embodiments, the exporter 414 can store, in the user data storage 130, the output from each batch processed by a child execution. Additionally or alternatively, the exporter 414 can execute the external API 132 based on the output.

In some embodiments, more than one distributed map state can be used together in the same workflow. A distributed map state can include another distributed map state with its own workflow. For example, a workflow can process a set of items to produce one output per item or batch in the first distributed map state, and then process the set of outputs from the first distributed map state using a second distributed map state to summarize or reduce the outputs to a final result. The worker 420 can determine, from the output from each batch, second batches. For each batch from the second batches, the dispatcher 412 can invoke, on a host computing device, a child execution of the workflow (from the additional distributed map state) with the second batch as input to the workflow. Completion of the child execution of the workflow (from the additional distributed map state) on the host computing device generates second output. The worker 420 can receive the second output generated by the child executions of the workflow (from the additional distributed map state) on the host computing devices. The exporter 414 can handle the second output from the child executions as specified by the workflow.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Further, the term "each," as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
    a data store storing computer-executable instructions; and
    one or more computer hardware processors in communication with the data store, wherein the one or more computer hardware processors are configured to execute the computer-executable instructions to at least:
        receive a first workflow comprising a distributed map state, the distributed map state comprising a resource, a batch parameter, and a second workflow; and
        execute the distributed map state, wherein to execute the distributed map state, the one or more computer hardware processors are configured to execute the computer-executable instructions to at least:
            for each batch of a plurality of batches,
                invoke, on a host computing device, a child execution of the second workflow, with the batch as input to the second workflow, wherein the plurality of batches is based at least in part on a plurality of items and the batch parameter, wherein the plurality of items is based at least in part on the resource,
                and wherein completion of the child execution of the second workflow on the host computing device generates output; and
                receive the output generated by the child execution of the second workflow on the host computing device; and
            store the output from each batch of the plurality of batches.

2. The system of claim 1, wherein the one or more computer hardware processors are configured to execute further computer-executable instructions to at least:
    cause presentation of a graphical user interface;
    receive, via the graphical user interface, user input of a step in a visual workflow; and
    generate the first workflow based at least in part on the step in the visual workflow.

3. The system of claim 1, wherein the second workflow comprises a first state and a second state, wherein output from the first state as input to the second state is limited to a first data input size, and wherein a data size of a collection of identifiers for the plurality of items exceeds the first data input size.

4. The system of claim 1,
wherein each identifier of a collection of identifiers identifies an item from the plurality of items.

5. The system of claim 1, wherein the batch parameter is a first number,
wherein a count of items in each group of a plurality of groups of items, from the plurality of items, satisfies a threshold value,
wherein the threshold value is based at least in part on the first number, and
wherein each group from the plurality of groups of items is a batch.

6. The system of claim 5, wherein the first number is one.

7. A computer-implemented method comprising:
receiving a first workflow definition defining a first workflow process that includes a distributed map state, the first workflow definition indicating, for the distributed map state, a resource, a batch parameter, and a second workflow;
executing the first workflow process in accordance with the first workflow definition; and
executing the distributed map state as part of the first workflow process, wherein executing the distributed map state comprises:
for each batch of a plurality of batches,
invoking, on a host computing device, a child execution of the second workflow with the batch as input to the second workflow, wherein the plurality of batches is based at least in part on a plurality of items and the batch parameter, wherein the plurality of items is based at least in part on the resource,
and wherein completion of the child execution of the second workflow on the host computing device generates output; and
receiving the output generated by the child execution of the second workflow on the host computing device; and
storing the output from each batch of the plurality of batches.

8. The computer-implemented method of claim 7, wherein the second workflow comprises a first state and a second state, wherein output from the first state as input to the second state is limited to a first data input size, and wherein a data size of a collection of item identifiers for the plurality of items exceeds the first data input size.

9. The computer-implemented method of claim 7, wherein
the output from each batch of the plurality of batches is stored in user data storage.

10. The computer-implemented method of claim 7, wherein the resource identifies a location in a second data store, and wherein the method further comprises:
loading a collection of item identifiers from the location in the second data store.

11. The computer-implemented method of claim 7, wherein at least one item of the plurality of items comprises an item identifier.

12. The computer-implemented method of claim 7,
wherein child executions of the second workflow on devices in a quantity of host computing devices execute concurrently, and wherein the quantity of host computing devices is based at least in part on a count of the plurality of batches.

13. The computer-implemented method of claim 12, wherein the quantity of host computing devices matches the count of the plurality of batches.

14. A system comprising:
a data store storing computer-executable instructions; and
one or more computer hardware processors in communication with the data store, wherein the one or more computer hardware processors are configured to execute the computer-executable instructions to at least:
receive a first workflow comprising a first distributed map state, the first distributed map state comprising a resource, a batch parameter, and a second workflow; and
execute the first distributed map state, wherein to execute the first distributed map state, the one or more computer hardware processors are configured to execute the computer-executable instructions to at least:
for each batch of a plurality of batches,
invoke, on a host computing device, a child execution of the second workflow with the batch as input to the second workflow, wherein the plurality of batches is based at least in part on a plurality of items and the batch parameter, wherein the plurality of items is based at least in part on the resource, and wherein completion of the child execution of the second workflow on the host computing device generates output; and
receive the output generated by the child execution of the second workflow on the host computing device; and
store the output from each batch of the plurality of batches.

15. The system of claim 14, wherein the resource identifies a second data store, and wherein the one or more computer hardware processors are configured to execute further computer-executable instructions to at least:
load a collection of item identifiers from the second data store.

16. The system of claim 14, wherein the resource identifies an Application Programming Interface (API), and wherein the one or more computer hardware processors are configured to execute further computer-executable instructions to at least:
call the API; and
receive, from the API, a collection of item identifiers.

17. The system of claim 14, wherein the batch parameter is a data size,
wherein a total data size for each group of a plurality of groups of items, from the plurality of items, satisfies a threshold value,
wherein the threshold value is based at least in part on the data size, and
wherein each group from the plurality of groups of items is a batch.

18. The system of claim 14,
wherein child executions of the second workflow on devices in a quantity of host computing devices execute concurrently, and wherein the quantity is based at least in part on a count of the plurality of batches.

19. The system of claim 18, wherein the quantity of host computing devices corresponds to the count of the plurality of batches.

20. The system of claim 18, wherein
the count of the plurality of batches fails to satisfy a concurrency criterion and
the quantity of host computing devices executing concurrently is associated with a concurrency number.

21. The system of claim 14, wherein the first distributed map state comprises a second distributed map state, the second distributed map state comprising a third workflow, the one or more computer hardware processors are configured to execute further computer-executable instructions to at least:

for each second batch of a second plurality of batches,
        invoke, on a second host computing device, a child execution of the third workflow with the second batch as input to the third workflow, wherein completion of the child execution of the third workflow on the second host computing device generates second output, and wherein the second plurality of batches is based at least in part on the output from each batch of the plurality of batches; and
        receive the second output generated by the child execution of the third workflow on the second host computing device; and
    store the second output from each second batch of the second plurality of batches.

\* \* \* \* \*